United States Patent [19]
Griffith

[11] Patent Number: 5,726,809
[45] Date of Patent: Mar. 10, 1998

[54] CAMERA SYSTEM AND AN OPTICAL ADAPTER TO REDUCE IMAGE FORMAT SIZE

[75] Inventor: John D. Griffith, Rochester, N.Y.

[73] Assignee: Eastman Kodak Company, Rochester, N.Y.

[21] Appl. No.: 560,228

[22] Filed: Nov. 21, 1995

Related U.S. Application Data

[62] Division of Ser. No. 248,275, May 24, 1994, Pat. No. 5,499,069.

[51] Int. Cl.[6] ............................ G02B 15/02; G02B 9/64; G02B 9/00
[52] U.S. Cl. ..................... 359/675; 359/754; 359/755
[58] Field of Search .................. 359/672–675, 359/754, 755

[56] References Cited

U.S. PATENT DOCUMENTS

| | | | |
|---|---|---|---|
| 4,264,151 | 4/1981 | Okano | 350/422 |
| 4,394,071 | 7/1983 | Yamada | 350/422 |
| 4,422,734 | 12/1983 | Tanaka et al. | 350/422 |
| 4,634,235 | 1/1987 | Fujioka | 350/422 |
| 4,814,811 | 3/1989 | Saito et al. | 354/412 |
| 4,823,199 | 4/1989 | Sakakibara et al. | 358/335 |
| 4,830,474 | 5/1989 | Nakayama et al. | 350/422 |
| 4,840,466 | 6/1989 | Yamada et al. | 350/422 |
| 4,862,293 | 8/1989 | Saito et al. | 360/35.1 |
| 4,913,537 | 4/1990 | Takase | 350/422 |
| 4,953,029 | 8/1990 | Morimoto et al. | 358/229 |

*Primary Examiner*—Scott J. Sugarman
*Attorney, Agent, or Firm*—Svetlana Z. Short

[57] ABSTRACT

A rear attachment is provided to permit objective lens systems designated for a certain image format to be used for imaging on a smaller image format. Thus, a 35 mm single lens reflex camera lens can be used to create an image on a smaller format CCD array.

8 Claims, 2 Drawing Sheets

CAMERA SYSTEM AND AN OPTICAL ADAPTER TO REDUCE IMAGE FORMAT SIZE

This is a Divisional of application Ser. No. US 08/248, 275, filed 24 May 1994 now U.S. Pat. No. 5,499,069.

FIELD OF THE INVENTION

The present invention is directed to an optical adapter and a camera system that incorporates such adapters that permit the objective lenses designed for a certain image format to be utilized for creating images of a smaller size image format. The optical adapter is a rear lens attachment which is particularly useful in combination with a 35 mm single lens reflex (SLR) camera for creating an image on a smaller size photosensitive surface, for example, a CCD array.

BACKGROUND OF THE INVENTION

Various forms of optical adapters and converters are known that permit objective lenses designed for a certain size image format to be utilized for imaging on another size image format. However, most of the known rear lens attachments which are designed to be placed in a converging beam increase the image size instead of reducing it. Examples of such rear attachments are disclosed in U.S. Pat. Nos. 4,913,537; 4,840,466; 4,394,071; and 4,422,734.

U.S. Pat. Nos. 4,830,474; 4,634,235 and 4,264,151 disclose optical adapters which decrease the image size when placed behind the objective lens. However, these adapters are not suitable for SLR cameras because while decreasing the focal length of the entire lens system, they are also decreasing its back focal length (BFL) and thus leave no room for an SLR camera mirror. In addition, they can not be used in other applications that require a long back focal length.

U.S. Pat. Nos. 4,862,293; 4,814,811; 4,823,199; and 4,953,029 describe lens systems in which an optical adapter includes a re-imaging lens system and a CCD array which are placed behind the film plane of a 135 format SLR camera. However, when this type of adapter is used, the camera body becomes thick and the viewfinder must be modified to provide comfortable viewing.

Thus, there is a need to provide a system in which the camera body could be kept compact (or in which the original camera body could still be used) and in which the viewfinder does not have to be modified or re-designed.

SUMMARY OF THE INVENTION

It is an object of the present invention to provide an improved optical adapter with a lens attachment system that fits between the primary optical system and its focal plane and reduces the image size and is suited for use in SLR cameras. It is a further object of the invention to provide a camera system that includes such an adapter and yet maintains compactness. The primary optical system is defined as an optical system capable of providing by itself a well-formed image of an object on an image plane or film plane.

These and other objects of the present invention are achieved by a camera system comprising: a) an SLR camera body which is arranged to carry a photosensitive medium at an image plane, the camera body including a mirror that is in an optical path of the camera in a viewing mode; b) a lens barrel located in front of .the camera body and including an objective lens system that is adapted to image an object at the image plane when the lens barrel is mounted directly to the camera body; and c) an optical adapter located between the lens barrel and the camera body for providing a smaller size image than the objective lens system provides when mounted directly to the camera body, the optical adapter including a lens attachment optical system which is located in front of the image formed by the objective lens system exclusive of the lens attachment optical system, the lens attachment optical system having a plurality of lens elements which have radii of curvature and spacings sufficient to create a back focal distance to clear (i.e. to provide space for) the SLR camera mirror.

According to another aspect of the present invention, an optical adapter suitable for use with an SLR camera having a camera body with a mirror in an optical path during a viewing mode comprising: a) a lens attachment optical system having a plurality of lens elements arranged into optical units, wherein the lens elements of the lens units have radii of curvature and spacings sufficient to create a smaller size image when the lens attachment system is placed in a converging beam created by an objective lens system and sufficient back focal distance to clear the SLR camera mirror; and b) an adapter housing having a first mounting member capable of attachment to an objective lens incorporating the primary objective lens system and a second mounting member capable of attachment to the camera body.

According to yet another aspect of the present invention, a rear lens attachment optical system adapted to be located in an optical path between a primary objective lens system of a camera and an SLR camera body having a mirror comprising from object side: a) a front-most lens unit having negative optical power, the front-most lens unit including a front-most lens element having a meniscus surface oriented towards the object side; and b) a rear lens unit having positive optical power comprising at least two positive and one negative power lens elements, wherein the lens elements of the lens units have radii of curvature and spacings sufficient to create (i) a smaller size image when the lens attachment system is placed in a converging beam created by the primary objective lens system and (ii) sufficient back focal distance to clear the SLR camera mirror.

One of the advantageous effects of the present invention is that it provides a rear-end lens attachment system that works on a strongly converging beam and still provides a good image quality. Yet, another advantage of the present invention is that it provides an adapter system and a color corrected rear-end lens attachment system for use in a SLR camera which has a long back focal length in order to clear the mirror in an SLR camera. The back focal length is defined as a distance measured along the optical axis, from the rear surface of the rear-most lens element to the focal plane or the image plane. It is yet another advantage of the present invention that it provides an adapter system which permits use of a standard compact camera body and which does not require viewfinder modification.

BRIEF DESCRIPTION OF THE DRAWINGS

The foregoing and other objects, features and advantages, as well as the presently preferred embodiment thereof, will be more apparent from reading of the following description in connection with the accompanying drawings.

DESCRIPTION OF THE PREFERRED EMBODIMENT

The following description is provided to enable any person skilled in the lens design art to make and use the invention and sets forth the best mode contemplated by the inventor of carrying out his invention. Various modifications, however, will remain readily apparent to those skilled in the above art, since the generic principals of the present invention have been defined herein specifically to provide a relatively simple and easily manufactured optical adapter.

Figure 2:
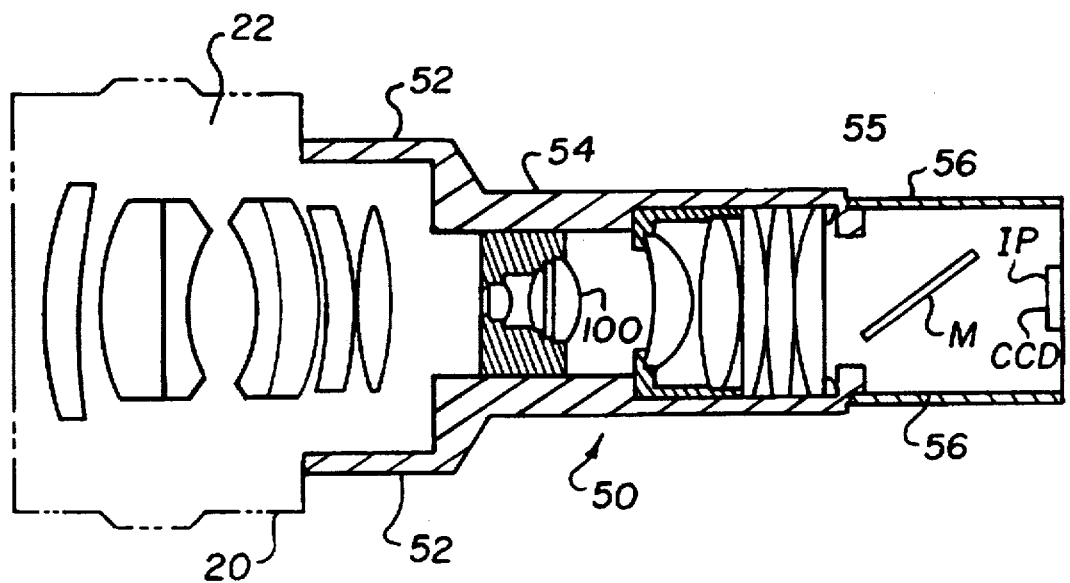
FIG. 2 is a partial sectional diagrammatic view of a rear optical adapter, including an adapter housing, of the present
Figure 1:
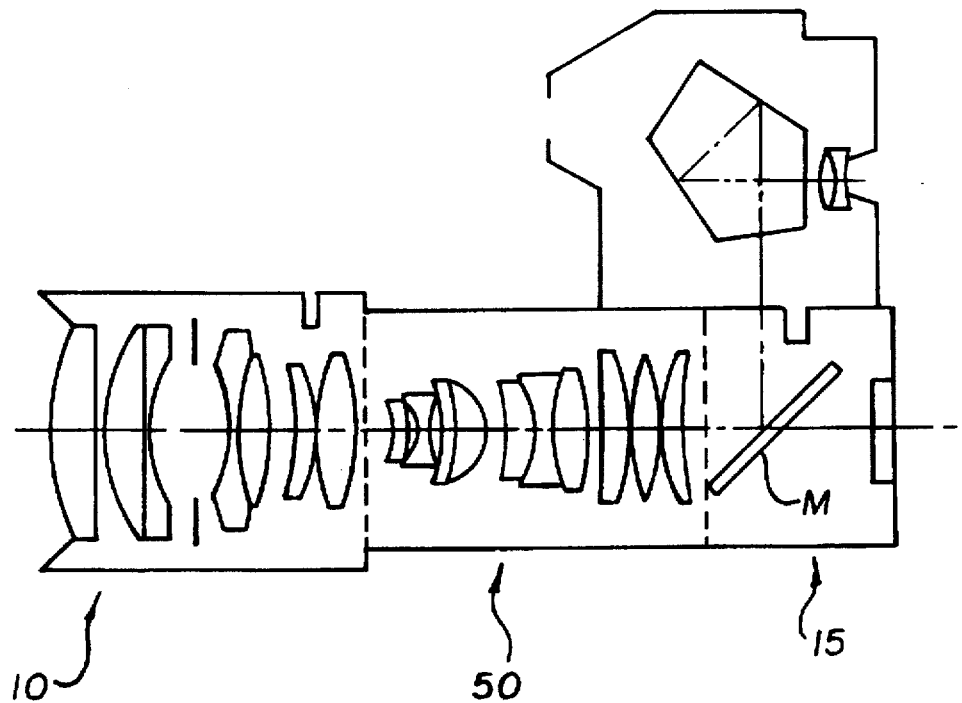
FIG. 1 is a side elevation, cross-sectional view, shown in schematic, of a camera system in accordance with the invention that incorporates an optical adapter that is also in accordance with the invention.

Referring to FIGS. 1 and 2, a camera 10 includes a lens barrel 20, with a primary optical system 22 (an objective lens system), and a camera body 15 having the same construction as a conventional SLR camera, including an SLR mirror M. The objective lens system 22 when mounted on a camera body focuses an image on a film plane for a conventional 35 mm format. As used herein, a conventional SLR camera body is assumed to have a mirror that either is moveable or partially transparent to allow exposure of a photosensitive material located and supported at an exposure plane. In addition to the mirror, a viewfinder is provided that contains an optical system for viewing an image reflected from the mirror. The camera body will also inlcude a shutter in the form of a curtain which traverses across the film plane in response to actuation by an operator of a shutter release button or the like. Other conventional SLR cameras use a between the lens shutter and include a cover for covering the photosensitive material during a viewing mode. The viewfinder may include a pentaprism and other optical elements for imaging the image of the object that reflects from the moveable mirror during the viewing mode. The camera body 15 includes a conventional structure that is adapted to support a photosensitive medium such as a CCD array located in the fill or image plane. The camera system further includes an optical adapter 50 sandwiched between the lens barrel and the camera body. According to one preferred embodiment, a 9×13½ mm rectangular CCD array is used. The short dimension of the array is in the plane at FIG. 1.

Referring to FIG. 2, optical adapter 50 (also called a rear lens attachment) is shown in a cross-sectional configuration juxtaposed adjacent to a lens barrel 20 (shown in phantom) which includes an objective lens system 22.

This optical adapter 50 includes a rear lens attachment optical system 100 and supporting structure for allowing system 100 to be located behind the objective lens system 22 and in front of the image plane IP where a photosensitive medium such as an electronic imaging system, an example of which is a CCD array system, is located.

The adapter 50 includes an adapter housing having a first mounting member 52 for attachment to the lens barrel, or to the cemented mounting structure of the objective lens system 22, a second mounting member 54 for mounting the lens elements of the lens attachment optical system 100 therein, and a third mounting member 55 for coupling the lens attachment optical system 100 to the picture-taking device 56, such as an original SLR camera body 15 which has a photosensitive medium such as a CCD array located at the image plane IP. While flat image planes are preferred, it is known that image planes may be curved particularly when photographic film is supported at the IP. The configuration and the size of the mounting members 52, 54, 55 preserves the optical distances between the objective lens system 22 and the lens attachment optical system 100 as well as between the lens attachment system 100 and the image plane IP (on which the CCD array is located) of the camera body 15.

Figure 3:
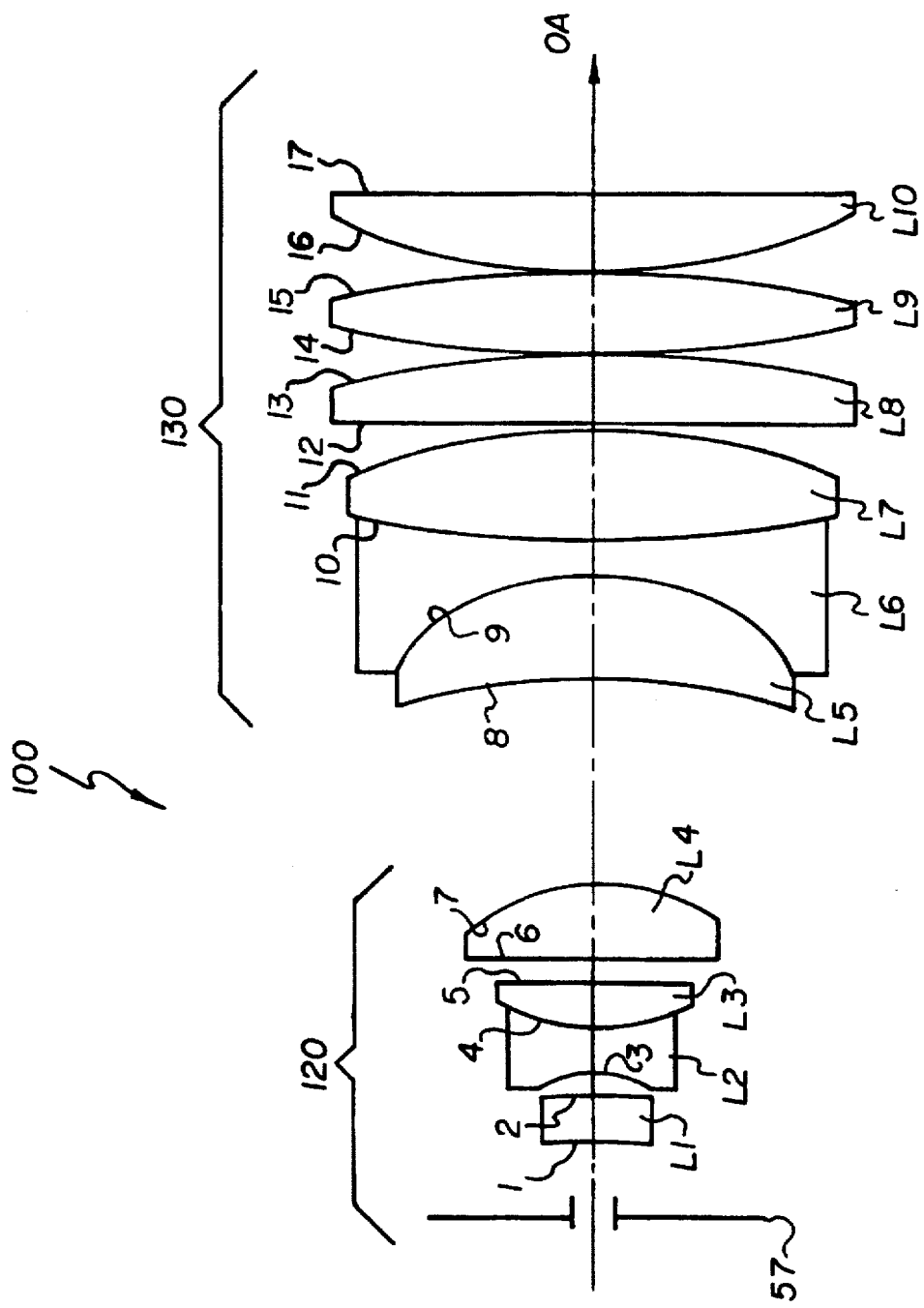
FIG. 3 is a sectional view of a lens attachment (also called an adapter lens system) utilized in the embodiment of FIG. 2.

Referring to FIG. 3, the lens attachment optical system 100 comprises two lens unit components, i.e., from an object side a front lens unit 120 having negative optical power and a rear lens unit 130 having positive optical power. According to the preferred embodiment, the front lens unit 120 comprises four lens elements L1, L2, L3 and L4. These four lens elements are: a first meniscus lens element L1; a second negative power lens element L2, which is biconcave; a third positive power lens element L3 which is cemented to the lens element L2; and a fourth rear lens element LA having a strongly convex surface 7 oriented towards the image plane.

According to the preferred embodiment, the power of the lens element L1 is positive. However, this lens element L1 may be constructed from a different optical material which may change the element's power from slightly positive to slightly negative. The lens element L1 has a concave surface 1 oriented towards and facing the exit pupil of the objective lens system 22 and a convex surface 2 which is oriented towards and facing a smaller format film or a CCD array located at the image plane IP.

According to the preferred embodiment, the rear lens unit 130 comprises a cemented triplet component in a form of a positive power lens element L5, a negative power lens element L6 and a positive power lens element L7. The negative power lens element L6 is located between the positive power lens elements L5 and L7.

The advantage of a cemented triplet in the rear lens unit is the reduction in air glass surfaces that are normally detrimental to light transmission especially at the large ray angles exiting the front lens unit 120 and entering the rear lens unit 130. In addition, because the lens elements are cemented, the sensitivity of the lens system to tilts and decenters introduced during the manufacturing process is also reduced and the superior color correction is achieved. In particular, in this embodiment, the cemented triplet is used to correct primary axial and lateral color.

An entrance pupil EP or stop ST of the lens attachment optical system 100 of the preferred embodiment is placed 5.5 mm in front of the front-most surface (surface 1) of lens element L1 and the size of the pupil controls the illumination of the image plane IP. The distance from the object side surface of the front-most lens element to the entrance pupil EP is measured from the vertex of that surface and along the optical axis OA.

Specific parameters of the lens attachment optical system 100 of the preferred embodiment are shown in Table 1 below, where F No. denotes the F number, f denotes the focal length, (ω) denotes the half field angle entering the attachment, $f_B$ is the back focal length, r is the radius of curvature of the individual lens element surface, d is the thickness of an individual lens or the axial distance between the adjacent surfaces in millimeters, n is the refractive index and v is the Abbe number of an individual lens element at the d-line.

TABLE 1

| F No. = F/5.33 | | f = 18.40 | | Obj. Dist. = 44.48 |
|---|---|---|---|---|
| Ω = 22.71 | | $f_B$ = 44.21 | | Image Dist. = 35 |
| Format = 15.76 mm diagonal | | | | Best Focus = +0.344 |

| Surface No. | r | d | n | V | Material |
|---|---|---|---|---|---|
|  | * | 5.523 |  |  |  |
| 1 | 40.7438 | 3.485 | 1.744 | 44.7 | LAF-2 |
| 2 | −23.9369 | 1.637 |  |  |  |
| 3 | −6.7220 | 3.485 | 1.755 | 52.3 | LASK-01 OHARA |
| 4 | 17.3937 | 2.973 | 1.755 | 27.6 | SF-4 |
| 5 | −318.046 | 1.553 |  |  |  |
| 6 | 2127.88 | 5.376 | 1.603 | 60.6 | SK-14 |
| 7 | −13.9956 | 14.670 |  |  |  |
| 8 | 57.9599 | 8.000 | 1.678 | 55.2 | LAKN-12 |
| 9 | −16.0838 | 2.500 | 1.805 | 25.4 | SFL-6 |
| 10 | 123.972 | 7.287 | 1.786 | 44.2 | LASF-01 OHARA |
| 11 | 42.9968 | 0.550 |  |  |  |
| 12 | −275.185 | 4.900 | 1.575 | 41.5 | LF-7 |
| 13 | −65.1231 | 0.110 |  |  |  |
| 14 | 131.656 | 5.378 | 1.575 | 41.5 | LF-7 |
| 15 | −140.510 | 0.500 |  |  |  |
| 16 | 52.9247 | 5.214 | 1.575 | 41.5 | LF-7 |
| 17 | 510.560 |  |  |  |  |

LENS LENGTH 67.618

*Entrance pupil location for the lens attachment optical system.

The current invention differs from the prior art in that it provides the unique advantage in that the combination of the primary optical system or objective lens system 22 and this rear lens attachment optical system has a sufficiently long back focal length to be used with 35 mm format SLR camera bodies.

This feature offers important commercial advantages because it allows photographers to continue to use 35 mm SLR camera bodies with which they are familiar when the camera body has been adapted to use an electronic imaging array in the image plane. As it is currently impractical to manufacture electronic imaging arrays as large as the 35 mm fill format, it is necessary to reduce the image size produced by the primary optical system to fit the size of the smaller electronic imaging array. One of the advantages of the present invention is that it accomplishes this goal.

Furthermore, the use of an attachment which fits between the primary optical system and the camera body is particularly important when using a modified camera body with certain biomedical instruments which are already designed with ports to which a 35 mm format SLR camera body can be attached. In these instruments an auxiliary optical system can not be installed in front of the primary optical system. Therefore, it is not possible to use an afocal front attachment to reduce the image size. A rear attachment between the primary optical system and the camera body is thus preferable. One of the advantages of the present invention is that it accomplishes this goal without a need to redesign a camera body and without having to modify a view finder. However, the image in the viewfinder will naturally be smaller.

Rear attachments to reduce image size are currently not commonly used because of the design complexity for these attachments. Reducing the image size requires that the net power of the attachment be positive. However, a negative element or group is required to balance the astigmatism and field curvature to obtain a flat field which is required when a CCD array is used in the image plane.

In addition, the entrance pupil of the attachment must coincide with the exit pupil of the primary optical system to efficiently transfer energy to the image plane. As the exit pupil of the primary optical system is often buried inside the glass of the primary system, the aperture stop of the attachment is located in front of the first lens element of the attachment. Therefore the design of the lens attachment optical system is asymmetric about the exit pupil of the objective lens system 20 (which location corresponds to the entrance pupil location of the lens attachment optical system 100). This in itself makes the correction of distortion, coma, and lateral color difficult. The image formed by the objective lens system is the object viewed by the attachment and it is located inside the lens attachment optical system 100. This further increases the difficulty of correcting the distortion, coma, and lateral color.

A long back focal length (BFL) requirement imposes additional difficulties. Because of this requirement, it is preferred that the lens system of the attachment be of a reverse telephoto configuration. To simultaneously achieve a long back focal length and reduction of the image height, a negative front lens unit 120 is used to change the converging axial bundle incident on the attachment into a diverging bundle. A positive lens unit 130 following the front lens unit 120 must therefore re-bend the diverging bundle into a bundle which converges more strongly than the bundle incident on the lens attachment optical system 100. This introduces large angles of incidence of the marginal ray in the front negative lens unit 120 and large marginal ray heights in the rear lens unit 130 which further increases the difficulty of correcting the spherical, coma, astigmatism, and distortion. The separation between the front negative and rear positive lens units is used to control the back focal length (BFL). Normally, the aperture stop of a reverse telephoto configuration is found in the rear positive lens unit. According to one aspect of this invention, the aperture stop is located in front of the negative lens unit 120 and this location corresponds to the location of the exit pupil of the objective lens system 20. This stop location adversely affects the ability to correct coma, astigmatism, and distortion. Furthermore, because of the separation between the negative and positive groups, the front and rear lens units 120, 130 were achromatized separately to control the lateral color.

It is also found that it is possible to balance the aberrations and achieve good performance when the primary objective lens system meets the criteria described below.

It is desirable to keep the ratio of the central airspace A to the focal length f′ of the lens attachment optical system 100 (i.e. A/f′) as small as possible for a more compact design. It is preferred that A/f′ be equal to or less than 2.0, $$i.e. \frac{A}{f'} \leq 2.0.$$

It is more preferable that this ratio be less than 1 and it is even more preferable that, $$0.5 < \frac{A}{f'} < 1.0.$$

It was found that to achieve a highest aberration control, it is preferred that this ratio be, $$0.7 < \frac{A}{f'} < 0.9.$$

The preferred embodiment achieves a ratio of back focal length BFL of the combination (of primary optical system and the attachment optical system) to focal length of the attachment f′ of 1.9.

$$i.e. \frac{BFL_{tot}}{f'} = 1.9,$$

when the ratio of the central air space A to the focal length of the attachment optical system f′ is about 0.8, i.e. $\frac{A}{f} = 0.8$.

The current invention also differs from the prior art in that it is designed to work with any primary optical system which meets certain criteria similar to that described below, while the prior art is designed to work with a specific primary lens.

More specifically, the preferred embodiment is designed to work with a primary optical system which meets the following criteria: 1) exit pupil location of the primary objective lens system is to the front (i.e. towards the object) of the first surface of the lens attachment optical system, preferably about 4–7 mm and most preferably 5–6 mm to the front of the first surface of the lens attachment optical system; 2) exit pupil diameter 4.40 mm and preferably 3.13 mm or less; 3) image location 50 mm behind the exit pupil; and 4) well-corrected imagery in a circular region of the image plane of radius under 20 mm and preferably under 17 mm and most preferably under 15.76 mm. When used with a primary objective lens system of this type, the ratio of the back focal length of the combination BFL to the focal length of the lens attachment optical system in this embodiment is 1.9. The format of a 35 mm film frame is 24 by 36 min. The ratio of the image size of the combination of the primary objective lens system and the lens attachment optical system 100 to the image size of the primary objective lens system is 0.5. Thus, it is ideally suited for the array size of 12 by 18 mm. However, when overfilling is deemed acceptable, as in here, a smaller array size such as a 9 mm×13½ mm array may be used. This embodiment provides the image quality of the image produced by the combination is adequate for an electronic image sensor array having a pixel size of 0.009 mm.

While the invention has been described with regard to CCD photosensitive media, the invention may also be used with other photosensitive media such as photographic film or other electronic recording media.

The invention has been described in detail with particular reference to a preferred embodiment thereof, but it will be understood that variations and modifications can be effected within the spirit and scope of the invention.

What is claimed is:

1. A lens system comprising in order from an object side:
   a) a front-most lens unit having negative optical power, said front lens unit including a first lens element, said first lens element being a meniscus with a concave surface oriented towards the object side, a second lens element, said second lens element being negative power biconcave lens element, and at least one more additional positive lens element; and
   b) a rear lens unit comprising a front positive power lens element, a middle negative power lens element, a middle positive power lens element and at least two more additional positive lens elements.

2. A lens system according to claim 1, wherein the ratio of a central airspace A and the focal length f of said lens attachment system is $$\frac{A}{f} \leq 2.0.$$

3. A lens system according to claim 2, wherein $$0.5 < \frac{A}{f} < 1.0.$$

4. A lens system according to claim 2, wherein $$0.7 < \frac{A}{f} < 0.9.$$

5. A lens system according to claim 1, wherein said second negative power biconvex lens element is cemented to one of said positive power lens elements of said front-most lens unit; and said front positive power lens element, said middle negative power lens element and a middle positive power lens element of said rear lens unit form a cemented triplet.

6. A lens system comprising from object side:
   a) a front-most lens unit having negative optical power, said front-most lens unit including, a front-most lens element having its meniscus surface oriented towards the object side, a biconcave negative power lens element, a positive power lens element cemented to said biconcave negative power lens element and an additional positive power lens element; and b) a positive power rear lens unit including a positive power cemented lens component comprising at least one negative power lens element and one positive power lens element cemented together and three positive power lens elements located behind said cemented lens component.

7. A lens system according to claim 6, wherein said cemented lens component of said positive power lens unit comprises in order:

a positive power lens element;

a biconcave negative power lens element; and a third positive power lens element.

8. A lens system according to claim 7, having the following parameters:

| F No. = F/5.33 | | f = 18.40 | | Obj. Dist. = 44.48 | |
| Ω = 22.71 | | $f_B$ = 44.21 | | Image Dist. = 35 | |
| Format = 15.76 mm diagonal | | | | Best Focus = +0.344 | |
| Surface No. | r | d | n | V | Material |
|---|---|---|---|---|---|
|  | * | 5.523 |  |  |  |
| 1 | 40.7438 | 3.485 | 1.744 | 44.7 | LAF-2 |
| 2 | −23.9369 | 1.637 |  |  |  |
| 3 | −6.7220 | 3.485 | 1.755 | 52.3 | LASK-01 OHARA |
| 4 | 17.3937 | 2.973 | 1.755 | 27.6 | SF-4 |
| 5 | −318.046 | 1.553 |  |  |  |
| 6 | 2127.88 | 5.376 | 1.603 | 60.6 | SK-14 |
| 7 | −13.9956 | 14.670 |  |  |  |
| 8 | 57.9599 | 8.000 | 1.678 | 55.2 | LAKN-12 |
| 9 | −16.0838 | 2.500 | 1.805 | 25.4 | SFL-6 |
| 10 | 123.972 | 7.287 | 1.786 | 44.2 | LASF-01 OHARA |
| 11 | 42.9968 | 0.550 |  |  |  |
| 12 | −275.185 | 4.900 | 1.575 | 41.5 | LF-7 |
| 13 | −65.1231 | 0.110 |  |  |  |
| 14 | 131.656 | 5.378 | 1.575 | 41.5 | LF-7 |
| 15 | −140.510 | 0.500 |  |  |  |
| 16 | 52.9247 | 5.214 | 1.575 | 41.5 | LF-7 |
| 17 | 510.560 |  |  |  |  |
| LENS LENGTH 67.618 | | | | | |

*Entrance pupil location for the lens attachment optical system.

\* \* \* \* \*